United States Patent
Yu et al.

(10) Patent No.: US 8,432,607 B2
(45) Date of Patent: Apr. 30, 2013

(54) ELECTROPHORETIC DISPLAY DEVICE AND METHOD FOR MANUFACTURING THE SAME

(75) Inventors: Young Jun Yu, Seoul (KR); Oh Nam Kwon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 64 days.

(21) Appl. No.: 13/222,159

(22) Filed: Aug. 31, 2011

(65) Prior Publication Data
US 2012/0092754 A1  Apr. 19, 2012

(30) Foreign Application Priority Data
Oct. 13, 2010  (KR) .................. 10-2010-0099865

(51) Int. Cl.
G02B 26/00  (2006.01)
(52) U.S. Cl.
USPC .......................................... 359/296
(58) Field of Classification Search .......... 359/296; 345/107, 105; 430/32, 34, 38; 204/450, 204/600
See application file for complete search history.

(56) References Cited

U.S. PATENT DOCUMENTS
6,524,153 B1  2/2003  Ikeda et al.
6,677,926 B2 *  1/2004  Biegelsen .................. 345/107

* cited by examiner

Primary Examiner — Tuyen Tra
(74) Attorney, Agent, or Firm — Morgan, Lewis & Bockius LLP (57) ABSTRACT

An electrophoretic display device includes a lower substrate having pixel electrodes thereon to define a plurality of pixel areas; partition walls formed on the lower substrate to surround the pixel electrodes; electrophoretic dispersion liquid having a plurality of charged particles colored to display colors, the electrophoretic dispersion liquid filled into the plurality of the pixel areas defined by pixel electrodes and surrounding the partition walls; a membrane layer disposed on the partition walls and covering the electrophoretic dispersion liquid, the membrane layer comprising a plurality of hole patterns at portions corresponding to the plurality of the pixel areas; and an upper substrate bonded with the lower substrate such that the membrane layer is disposed therebetween.

13 Claims, 9 Drawing Sheets

ELECTROPHORETIC DISPLAY DEVICE AND METHOD FOR MANUFACTURING THE SAME

CROSS REFERENCE TO RELATED APPLICATION

This application claims the benefit of the Patent Korean Application No. 10-2010-0099865, filed on Oct. 13, 2010, which is hereby incorporated by reference as if fully set forth herein.

BACKGROUND OF THE DISCLOSURE

1. Field of the Disclosure

The present invention relates to an electrophoretic display device, and more particularly to an electrophoretic display device and a method for manufacturing the same to enhance both driving stability and display quality, with improved production efficiency.

2. Discussion of the Related Art

In general, an electrophoretic display device refers to a device capable of displaying images using electrophoresis wherein colored charge particles are moved by an electric field applied from the outside. Here, 'electrophoresis' means a phenomenon that charged particles are moved in an electrophoretic dispersion liquid (electrophoretic ink) by coulomb forces when an electric field is applied to the electrophoretic dispersion liquid having the charged particles dispersed therein.

An electrophoretic display device using electrophoresis has a bistability that allows original images to be displayed for a relatively long time even if an applied voltage is removed. In other words, the electrophoretic display device can maintain a specific screen for a relatively long time without voltages being continuously applied thereto. As a result, the electrophoretic display device may be applied to e-books which do not require quick changes of screens.

Moreover, an electrophoretic display device has no dependence on viewing angle and can provide images that are comfortable to eyes and remarkably similar to paper, unlike a liquid crystal display device. As a result, demands for the electrophoretic display devices have been increasing as next generation display devices because electrophoretic display devices are flexible, have low power consumption and are eco-friendly.

Figure 1:
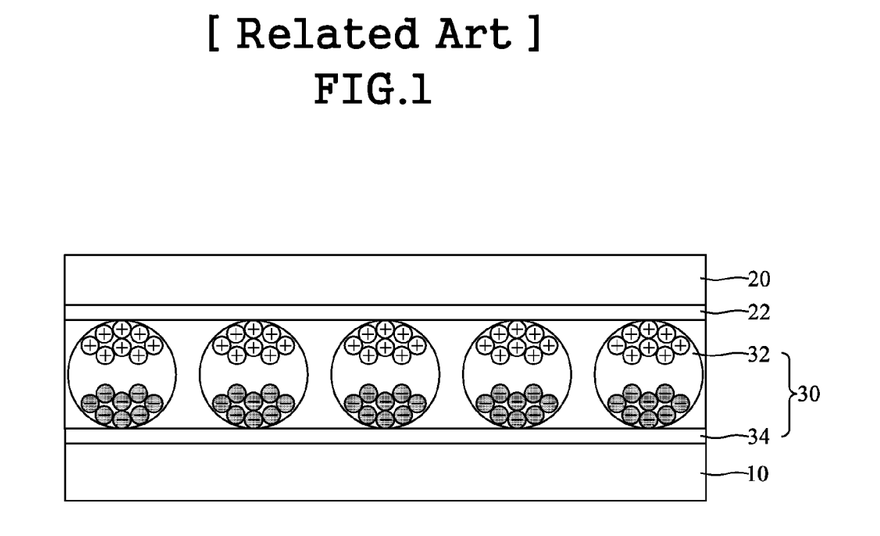
FIG. 1 is a sectional view illustrating a structure of an electrophoretic display device according to the related art.

FIG. 1 is a sectional view illustrating a structure of a display device according to the related art.

With reference to FIG. 1, an electrophoretic display device includes lower and upper substrates 10 and 20 bonded to each other with an electrophoretic film 30 disposed between the lower substrate 10 and the upper substrate 20. The lower substrate 10 includes a plurality of pixel electrodes (not shown) opposed to a common electrode 22 formed on the upper substrate 20 and a plurality of thin film transistors (TFT, not shown) to supply voltages to the plurality of the pixel electrodes as switching devices. The electrophoretic film 30 includes a plurality of microcapsules 32 having charged particles and a dielectric solvent and an adhesive layer 34 configured to protect the plurality of the microcapsules and to attach the electrophoretic film to the lower substrate 10.

Here, the microcapsule 32 includes the dielectric solvent and charged particles. Some of the charged particles are charged to have a positive (+) pole and the others are charged to have a negative (−) pole. When an electric field is formed between the pixel electrodes of the lower substrate 10 and the common electrode 22 of the upper substrate 20, the charged particles provided in the microcapsule 32 are moved within the dielectric solvent, thereby presenting an image.

According to the electrophoretic display device of FIG. 1, the upper substrate 20, the lower substrate 10 and the laminated electrophoretic film 30 are manufactured. After that, the electrophoretic film 30 is disposed between the lower substrate 10 and the upper substrate 20.

The electrophoretic film 30 is kept and carried, with a release film attached to an adhesive layer 34. Just before the electrophoretic film 30 is laminated onto the lower substrate 34, the release film is eliminated. After that, the adhesive layer 34 is attached to the lower substrate 10 in a laminating process.

As described above, the manufacture process of the electrophoretic display device is quite complicated because the lower substrate 10, the upper substrate 20 and the electrophoretic film 30 have to be manufactured separately. As a result, the manufacture of the electrophoretic display device will require much time and productivity might deteriorate disadvantageously. Also, the electrophoretic film 30 additionally has to be manufactured and production cost might be disadvantageously increased.

To overcome such disadvantages of the electrophoretic display device, technology enabling the electrophoretic layer internalized on the lower substrate has been under development. However, a structure and a manufacturing process technology for internalizing the electrophoretic layer on the lower substrate have not matured to solve existing problems. As a result, it is difficult to apply the technology to actual production.

SUMMARY OF THE DISCLOSURE

Accordingly, the present invention is directed to an electrophoretic display device and a method for manufacturing the same.

An object of the present invention is to provide an elelctrophoretic display device having a high display quality, and a method for manufacturing the electrophoretic display device.

Another object of the present invention is to provide an electrophoretic display device to enhance manufacture efficiency, and a method for manufacturing the electrophoretic display device.

A further object of the present invention is to provide an electrophoretic display device to enhance driving stability and reliability of electrophoretic dispersion liquid internalized on a lower substrate provided therein, and a method for manufacturing the electrophoretic display device.

A still further object of the present invention is to provide an electrophoretic display device to present high quality images using a variety of colors, and a method for manufacturing the electrophoretic display device.

A further object of the present invention is to provide an electrophoretic display device to prevent incomplete filling of the electrophoretic dispersion liquid internalized on the lower substrate, and a method for improving a filling method of the electrophoretic dispersion liquid in a manufacturing process.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrophoretic display device comprises a lower substrate having pixel electrodes thereon to define a plurality of pixel areas; partition walls formed on the lower substrate to surround the pixel electrodes; electrophoretic dispersion liquid comprising a plurality of charged particles colored to display colors, the electrophoretic dispersion liquid filled into the plurality of the pixel areas defined by pixel electrodes and surrounding the partition walls; a membrane layer disposed on the partition walls and covering the electrophoretic dispersion liquid, the membrane layer comprising a plurality of hole patterns at portions corresponding to the plurality of the pixel areas; and an upper substrate bonded with the lower substrate such that the membrane layer is disposed therebetween.

In another aspect, a method for manufacturing an electrophoretic display device comprises forming a plurality of pixel electrodes on a lower substrate and forming partition walls to surround the plurality of the pixel electrodes; filling electrophoretic dispersion liquid comprising a plurality of charged particles colored to display predetermined colors into pixel areas defined by the pixel electrodes and the partition walls; disposing a membrane layer on the partition walls, the membrane layer comprising a plurality of hole patterns at portions corresponding to the plurality of the pixel areas; and bonding an upper substrate with the lower substrate such that the membrane layer disposed therebetween.

The present invention has a number of advantages including the following exemplary advantages.

For example, the present invention may provide an electrophoretic display device having a high display quality, and a method for manufacturing the device.

In addition, the present invention may provide an electrophoretic display device to enhance manufacture efficiency, and a method for manufacturing the electrophoretic display device.

Further, the present invention may provide an electrophoretic display device to enhance driving stability and reliability of electrophoretic dispersion liquid internalized on a lower substrate provided therein, and a method for manufacturing the electrophoretic display device.

Also, the present invention may provide an electrophoretic display device to present high quality images using a variety of colors, and a method for manufacturing the electrophoretic display device.

Moreover, the present invention may provide an electrophoretic display device to prevent incomplete filling of the electrophoretic dispersion liquid internalized on the lower substrate, and a method for improving a filling method of the electrophoretic dispersion liquid in a manufacturing process.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE INVENTION

Reference will now be made in detail to the specific embodiments of the present invention, examples of which are illustrated in the accompanying drawings. Wherever possible, the same reference numbers will be used throughout the drawings to refer to the same or like parts. As follows, an electrophoretic display device and a method for manufacturing the electrophoretic display device according to exemplary embodiments of the present invention will be described in detail in reference to the accompanying drawings. When the disclosure of the embodiments of the present invention includes a description that a structure is formed 'on' or 'below' another structure, this disclosure should be interpreted to include the structures being in contact with each other as well as there being a third structure disposed between the structures.

The present invention proposes an electrophoretic display device including electrophoretic dispersion liquid internalized on a lower substrate, with charged particles and a dielectric solvent, and a method for manufacturing the electrophoretic display device. The present invention, which will be disclosed as follows, may be applied to a mono-type electrophoretic display device, an electrophoretic display device including a color filter and an electrophoretic display device including charged particles colored with one of red, blue, green, yellow, cyan, magenta, black and white. The present invention may be applied to all types of electrophoretic display devices, regardless of mono or color presentation. As follows, a color type electrophoretic display device and a manufacturing method of the same will be embodied.

Figure 2:
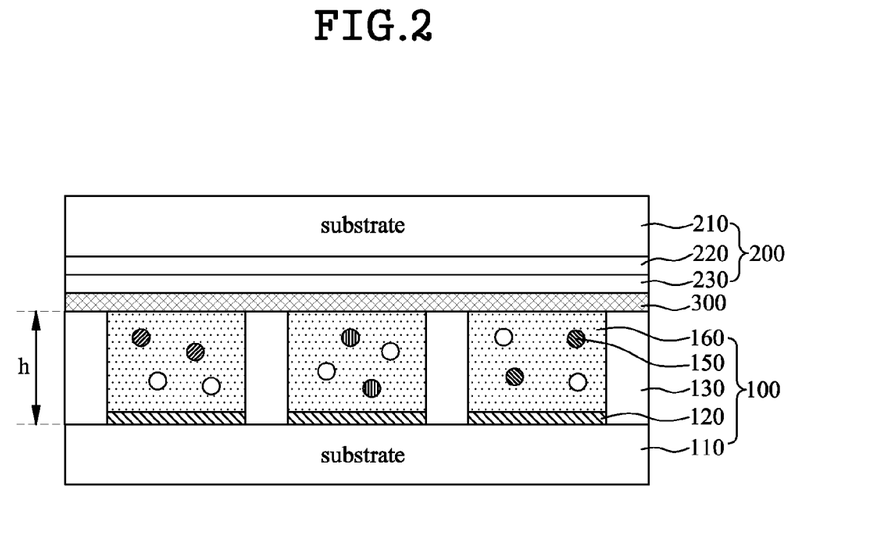
FIG. 2 is a sectional view illustrating a structure of an electrophoretic display device according to an exemplary embodiment of the present invention.
Figure 3:
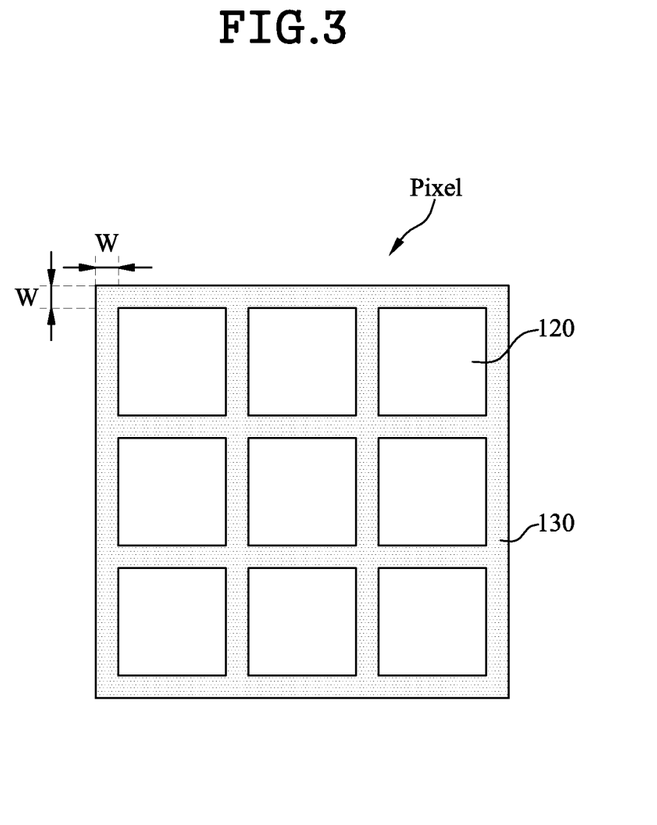
FIG. 3 is a diagram illustrating a lower substrate provided in the electrophoretic display device according to the exemplary embodiment of FIG. 2.
Figure 4A:
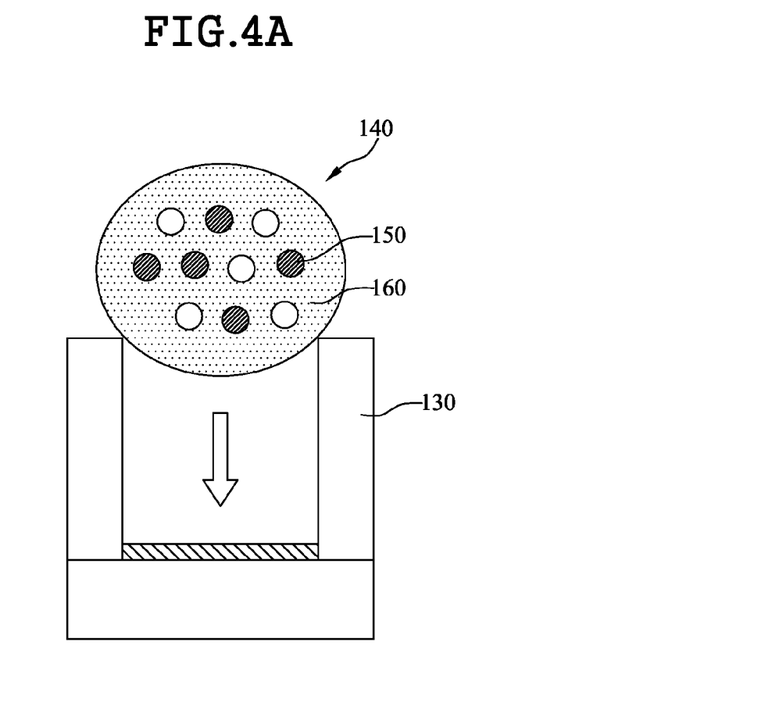
FIGS. 4A and 4B are diagrams schematically illustrating a method for filling the lower substrate with electrophoretic dispersion liquid.
Figure 4B:
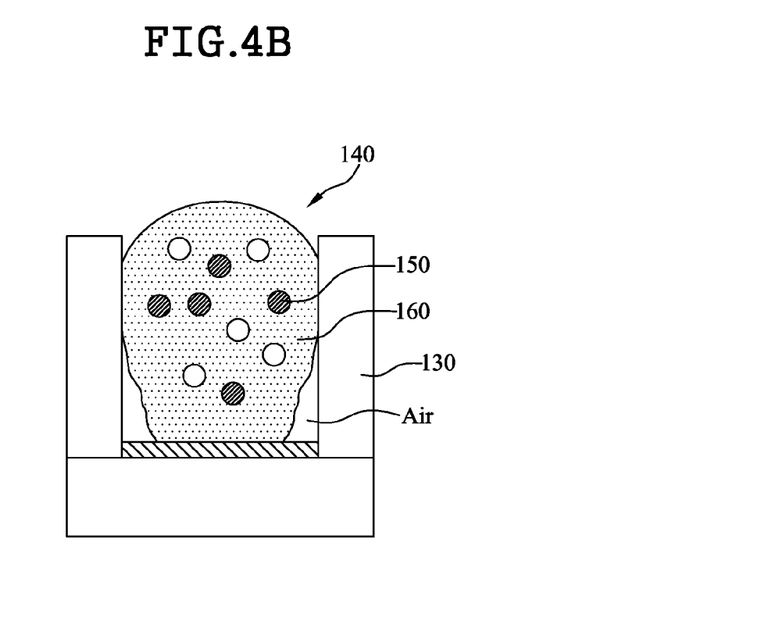

FIG. 2 is a sectional view illustrating a structure of an electrophoretic display device according to an exemplary embodiment of the present invention. FIG. 3 is a diagram illustrating a lower substrate of the electrophoretic display device according to an embodiment of the present invention. FIG. 4 is a diagram schematically illustrating a method for filling the lower substrate with electrophoretic dispersion liquid.

With reference to FIGS. 2 to 4, the electrophoretic display device according to an exemplary embodiment of the present invention includes an upper substrate 200, a lower substrate 100 having electrophoretic dispersion liquid internalized thereon and a membrane layer 300 formed between the upper substrate 200 and the lower substrate 100. The upper substrate 200 includes an upper base substrate 210, a common electrode 220 and an adhesive layer (or sealant layer) 230. The upper substrate 200 has to be transparent to display images. As a result, the upper base substrate 210 is formed of transparent glass or transparent plastic having flexibility. The common electrode 220 is formed corresponding to pixel electrodes 120 formed on the lower substrate 100 to drive the charged particles 150 internalized on the lower substrate 100. Here, the common electrode 220 supplies a common voltage (Vcom) to a plurality of pixel areas. The common electrode 220 is formed of a conductive material, such as indium tin oxide (ITO) and indium zinc oxide (IZO).

The adhesive layer 230 is configured to be adhered to the membrane layer 300, which will be described layer, and is formed of a transparent organic material or a transparent inorganic material on the common electrode 220. The adhesive layer 230 allows the electrophoretic dispersion liquid internalized on the lower substrate 100 to be closed airtight. In addition, the adhesive layer 230 prevents the charged particles 150 from contacting with the common electrode 220.

The lower substrate 100 includes a lower base substrate 110, a plurality of pixel electrodes 120 formed on the lower base substrate 110, partition walls 130 formed to surround the plurality of the pixel electrodes 120 to define a plurality of pixel areas, and an electrophoretic layer formed on the pixel areas defined by the partition walls 130. Here, the partition walls 130 may be formed as a single structure to be contiguous as shown in FIG. 3.

The pixel areas (or the filled-cells) defined by the partition walls 130 are filled with the electrophoretic dispersion liquid 140, to form the electrophoretic layer. The electrophoretic dispersion liquid 140 includes a plurality of charged particles 150 and a dielectric solvent 160 having a binder.

The lower base substrate 110 may be a transparent glass substrate, a plastic substrate having flexibility or a metal substrate. However, the lower base substrate 110 is located opposite to a screen displaying images and does not have to be transparent.

Although not shown in the drawings, a plurality of gate lines and a plurality of data lines crossed with each other may be formed on the lower base substrate 110. A thin film transistor (TFT) is formed at each intersection between the gate and data lines. Here, each of the gate and data lines may be a single layer formed of silver (Ag), aluminum (Al) or alloy of Ag and Al, with low resistivity. Alternatively, it may be a multilayer including such a single layer and another layer formed of chrome (Cr), titanium (Ti) or tantalum (Ta) with good electrical characteristics. A gate insulation layer configured of a nitride layer may be located between the gate line and the data line. Gate electrodes of the thin film transistors (TFT) may be connected with the gate lines and source electrodes of the thin film transistors (TFT) may be connected with the data lines. Drain electrodes of the thin film transistors (TFT) may be connected with the pixel electrodes 120.

The pixel electrodes 120 are formed to be corresponding to the plurality of the sub-pixels defined by the partition walls 130. The pixel electrodes 124 supply voltages to the sub-pixels by switching of the thin film transistors (TFT). The pixel electrodes 120 may be configured as a conductive metal layer electrically connected to the drain electrodes of the thin film transistors via respective contact holes. The pixel electrode 124 may be formed of a material, for example, copper, aluminum and indium tin oxide (ITO). Alternatively, the pixel electrode 124 may be formed by multilayering of nickel and/or gold on the copper, aluminum or indium tin oxide (ITO) layer.

An electric field is formed at each of the pixel areas by the common electrode 220 of the upper substrate 200 and data voltages applied to the pixel electrodes 120 of the lower substrate 100. The electric field moves the charged particles 150 within the dielectric solvent and images are presented accordingly.

As shown in FIG. 3, partition walls 130 are formed on the lower substrate 120 to surround each of the pixel electrodes 120 and define the plurality of the pixel areas. As shown in FIG. 4, the partition walls 130 define the cells filled with the electrophoretic dispersion liquid 140. Here, each partition wall 130 is formed to have a predetermined height (h) of 10 um~100 um and a predetermined width (w) of 5 um~30 um, for example. As discussed above, the partition walls 130 may be formed as a single structure to be contiguous. Here, the partition wall 130 may be formed of a non polar organic material, such as non polar polymer and non polar epoxy acrylic resin or a non polar organic material, which can be coated to form an organic SAM layer to have identical physical properties to physical properties of the dielectric solvent 160, in a photolithography process, a mold printing process, an imprinting process or an embossing process.

The electrophoretic dispersion liquid 140 includes the charged particles 150 and the dielectric solvent 160 having the binder. Here, some of the charged particles 150 are charged to have a positive (+) pole and the others are charged to have a negative (−) pole. The charged particles 150 may be colored with at least one of red, blue, green, yellow, cyan, magenta, black and white colors. The dielectric solvent 160 may be halogenated solvents, saturated hydrocarbons, silicone oils, low molecular weight halogen-containing polymers, epoxides, vinyl ester, aromatic hydrocarbon, toluene, naphthalene, paraffinic liquids, or poly chlorotrifluoroethylene polymers. Here, the dielectric solvent 160 has the physical properties of the non polar.

The electrophoretic dispersion liquid 140 is filled into the pixel areas (the filled cells) defined by the partition walls 130 according to a die coating method, a casting method, a bar coating method, a slit coating method, a dispense method, a squeezing method, a screen printing method, an inkjet printing method or a photolithography method.

Figure 5:
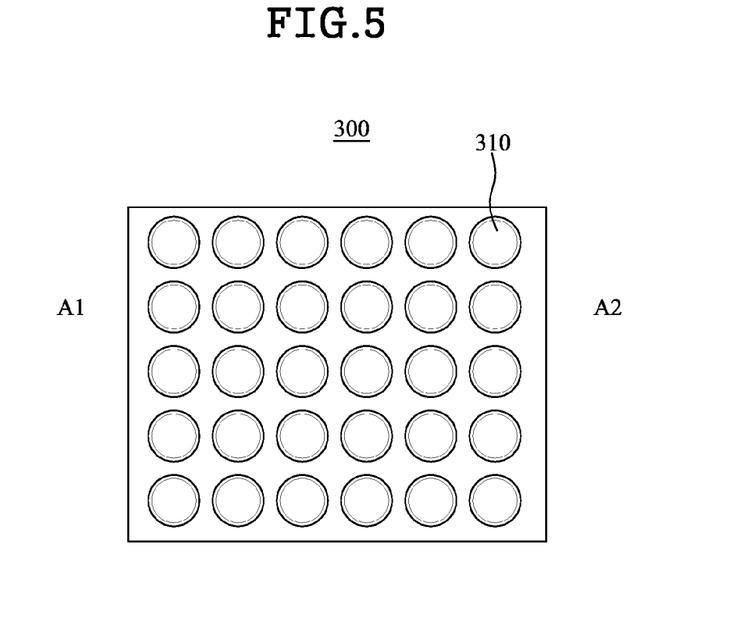
FIG. 5 is a diagram illustrating a membrane layer provided in the electrophoretic display device according to an exemplary embodiment of the present invention.

The membrane layer 300 shown in FIG. 5, which is configured to fill the electrophoretic dispersion liquid 140 into the pixel areas (filled cells) uniformly, is a thin layer, such as a cell layer, with a thickness of 200 nm~1 um. The membrane layer 300 includes a plurality of hole patterns 310 formed to expose (open) the pixel areas entirely or partially. The membrane layer 300 is formed of a non polar organic layer to have identical physical properties to the physical properties of the dielectric solvent 160. For example, the membrane layer 300 may be formed of non polar polymer or non polar epoxy acrylic resin. Also, the membrane layer 300 may be provided with a yellow tint to improve contrast. Here, FIG. 5 is a partial view which shows the part of the entire membrane layer 300 corresponding to one pixel area.

The membrane layer 300 may be formed in a photolithography, imprinting or embossing process. Here, the plurality of the hole patterns 310 are aligned to correspond to an entire portion of the pixel areas or a predetermined portion of the pixel areas defined by the partition wall 130. Top surfaces of the pixel areas may be exposed or opened via the plurality of the hole patterns 310. Here, the hole pattern 310 may have a diameter of 1 nm~1 um. The membrane layer 300 is located on the partition walls 130 formed of a material identical to the material used to form the partition wall 130. (FIG. 3) As a result, the membrane layer 300 may be located on the electrophoretic dispersion liquid 140 filled in the pixel areas. (FIGS. 4A-4B)

Here, the electrophoretic dispersion liquid 140 may be filled into the pixel areas, in an appearance of drops as shown in FIG. 4A. As time passes, the electrophoretic dispersion liquid 140 is filled into the pixel areas by gravity. As shown in FIG. 4B, air located in the pixel areas while the electrophoretic dispersion liquid 140 is filled into the pixel areas fails to be exhausted outside and vapors might be generated in lower portions of the pixel areas.

Figure 6:
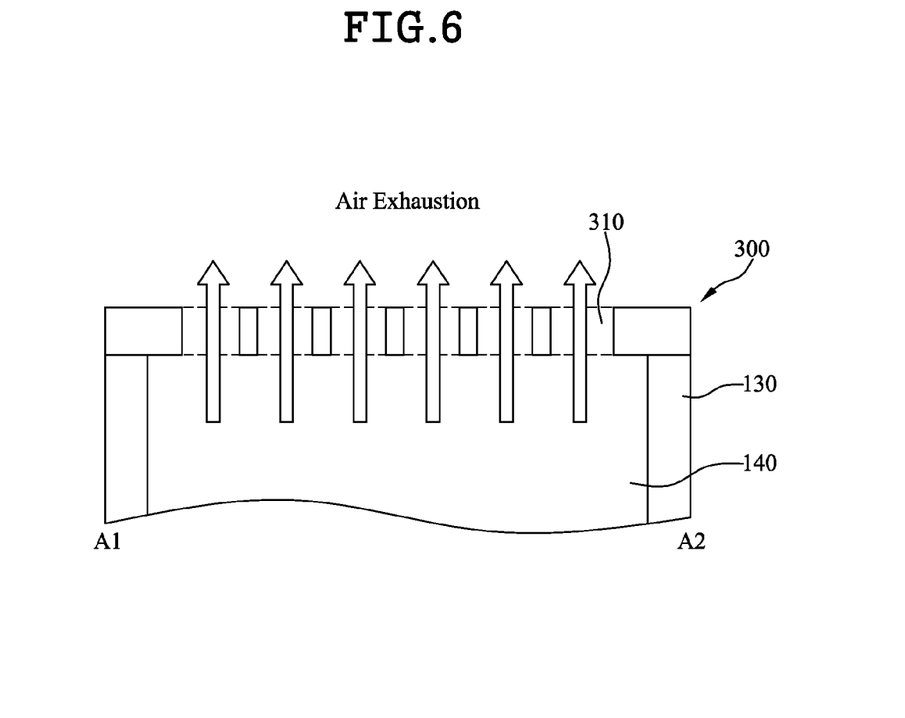
FIG. 6 is a diagram illustrating the membrane layer shown in FIG. 5 which exhausts air inside the lower substrate outside.

According to the present invention, the air remaining in the pixel areas may be exhausted via the plurality of the hole patterns 310 provided in the membrane layer 300 located on the partition walls 130, as shown in FIG. 6. Here, FIG. 6 is a sectional view illustrating the membrane layer 300 along A1-A2 line shown in FIG. 5.

When the membrane layer 300 is formed on the electrophoretic dispersion liquid 140, a predetermined space may be formed, with the electrophoretic dispersion liquid 140 formed of the organic material being adhesive with respect to the membrane layer 300, to exhaust the vapors outside the pixel areas. As a result, the air remaining in the pixel areas may be exhausted outside via the hole patterns 310 of the membrane layer 300. Moreover, vapors might be generated during the bonding processing between the upper substrate 200 and the lower substrate 100 filled with the electrophoretic dispersion liquid 140.

As mentioned above, the membrane layer 300 may exhaust the air remaining in the pixel areas outside and prevent the vapors from being generated during the bonding process between the upper substrate 200 and the lower substrate 100. Owing to the membrane layer 300, the generation of the vapors may be prevented and the electrophoretic dispersion liquid may be then filled into the pixel areas smoothly and completely. That is, incomplete filling and overfilling of the electrophoretic dispersion liquid 140 is prevented.

The quantity of the electrophoretic dispersion liquid 140 filled into the pixel areas according to the volume of the pixel areas may be set. If a large amount of vapors are generated in the pixel areas, the electrophoretic dispersion liquid 140 supposed to be filled into each of the pixel areas happens to overflow up to the partition walls to be contaminated or into a neighboring pixel area.

Even if the electrophoretic dispersion liquid supposed to be filled into specific pixel areas overflows into the neighboring pixel areas, the electrophoretic display device can present mono-images without difficulties or problems.

However, when the electrophoretic display device presents color images, the charged particles 150 colored with predetermined colors are filled into the corresponding pixel areas selectively. If the electrophoretic dispersion liquid 140 supposed to be filled into a predetermined pixel area happens to overflow into a neighboring pixel area, normal color image presentation cannot be accomplished.

The membrane layer 300 prevents the vapor generation in the pixel areas and prevents the electrophoretic dispersion liquid 140 supposed to be filled into corresponding pixel areas from overflowing up to the partition wall to be contaminated or flowing into neighboring pixel areas. Furthermore, the entire portion or the predetermined portion of the pixel areas may be opened via the plurality of the hole patterns 310 provided in the membrane layer 300, such that the electric field formed between the common electrode 220 and the pixel electrodes 120 may not be affected.

The membrane layer 300 may be formed directly on the partition walls 130 in the manufacturing process. Alternatively, the membrane layer 300 may be manufactured separately. After the pixel areas are filled with the electrophoretic dispersion liquid 140, the membrane layer 300 may be attached to a top of the partition walls 130.

Another embodiment presents the membrane layer 300 formed on the lower substrate 100.

Figure 7:
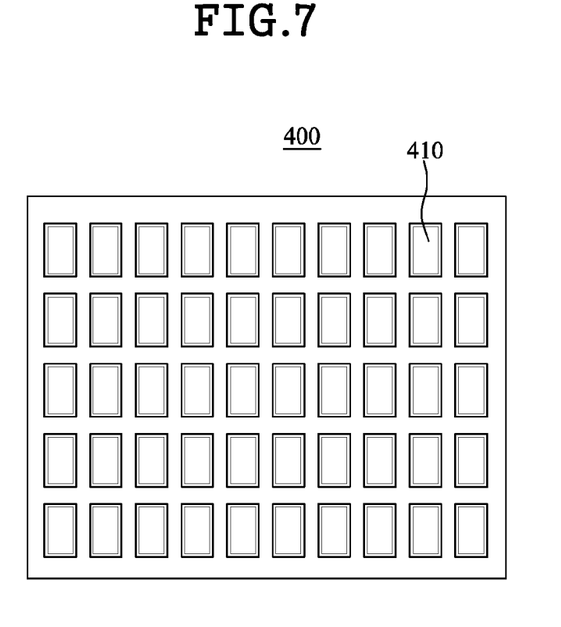
FIGS. 7 and 8 are diagrams illustrating a membrane layer according to other exemplary embodiments of the present invention.

According to another embodiment of the present invention, a plurality of hole patterns 410 formed in a membrane layer 400 may have a rectangular shape, as shown in FIG. 7. Here, FIG. 7 is a partial view which shows the part of the entire membrane layer 300 corresponding to one pixel area.

Figure 8:
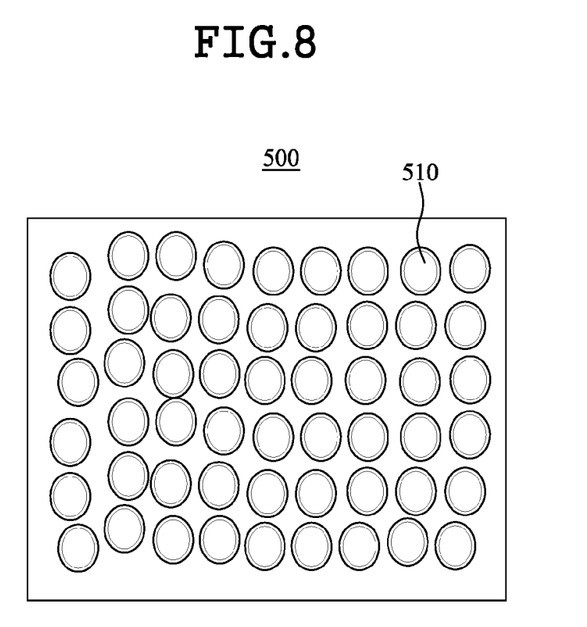

In addition, as shown in FIG. 8, a plurality of hole patterns 510 may be formed random in a membrane layer 510. All of the hole patterns 510 formed in the membrane layer 500 shown in FIG. 8 may be formed densely with a diameter of 1 nm~1 μm enough to open (expose) the pixel areas, even though not aligned corresponding to the pixel areas. Because of that, there is no problem exhausting the vapors which remains in the pixel areas. Here, FIG. 8 is a partial view which shows the part of the entire membrane layer 300 corresponding to one pixel area.

According to the electrophoretic display device including the above configuration according to embodiments of the present invention, the pixel areas (the filled-cells) defined by the partition wall 130 are filled with the electrophoretic dispersion liquid 140. As a result, the electrophoretic layer is internalized on the lower substrate 100 and mono-images and color-images may be then presented.

Furthermore, according to the electrophoretic display device including the above configuration according to embodiments of the present invention, vapors which might be generated during the filling process of the electrophoretic dispersion liquid 140 during the manufacturing process of the electrophoretic display device may be exhausted outside by the membrane layer 300, thereby permitting the electrophoretic dispersion liquid 140 to be filled into the lower substrate 100 smoothly and completely. Because of that, driving stability and reliability of the electrophoretic dispersion liquid 140 may be improved.

Additionally, according to the electrophoretic display device including the above configuration according to embodiments of the present invention, reflectance and contrast can be heightened and a display quality of the electrophoretic display device may be enhanced accordingly.

FIGS. 9 to 16 are diagrams illustrating a method for manufacturing the electrophoretic display device according to exemplary embodiments of the present invention. With reference to FIGS. 9 to 16, a manufacturing method of the electrophoretic display device according to embodiments of the present invention will be described as follows.

Figure 9:
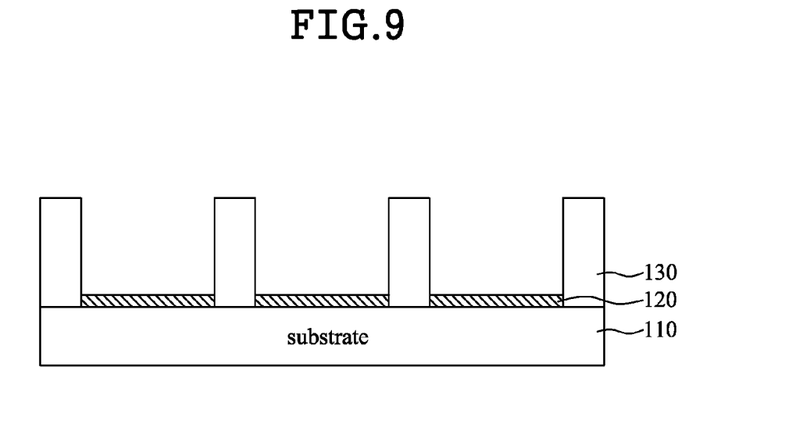
FIG. 9 is a diagram illustrating a portion of a method for manufacturing the electrophoretic display device according to an example embodiment of the present invention.

As shown in FIG. 9, a conductive material, such as copper, aluminum or ITO, is coated on the lower substrate having the plurality of the thin film transistors (TFT) formed thereon respectively corresponding to the plurality of the pixel areas to form a conductive layer. Hence, the conductive layer is patterned using a photoresist (photoacryl) in a photolithography or etching process, such that the plurality of the pixel electrodes 120 may be formed on the plurality of the pixel areas, respectively.

To form the pixel electrodes 120, nickel and/or gold may be multilayered on the copper the copper, aluminum or indium tin oxide (ITO) material. After that, a non polar organic material, such as non polar polymer and non polar epoxy acrylic resin or a non polar organic material, which can be coated to form an organic SAM layer may be coated on the lower base substrate 110 having the pixel electrodes 120 formed thereon. The coated non polar organic material is patterned to form the partition walls 130 configured to surround the pixel electrodes 120 formed in the pixel areas, respectively.

Here, the partition walls 130 may define the plurality of the pixel areas (the filled-cells) which will be filled with the electrophoretic dispersion liquid. At this time, the partition walls 130 may have a predetermined height (h) of 10 um~100 µm and a predetermined width (w) of 5 m~30 um. The partition walls 130 may be formed according to a photolithography method, an imprinting method, a mold printing method or an embossing method.

Although not shown in FIG. 9, the gate and data lines are formed on the lower base substrate 110. The thin film transistors (TFT) are formed at intersections formed between the gate lines and the data lines, respectively.

Figure 10:
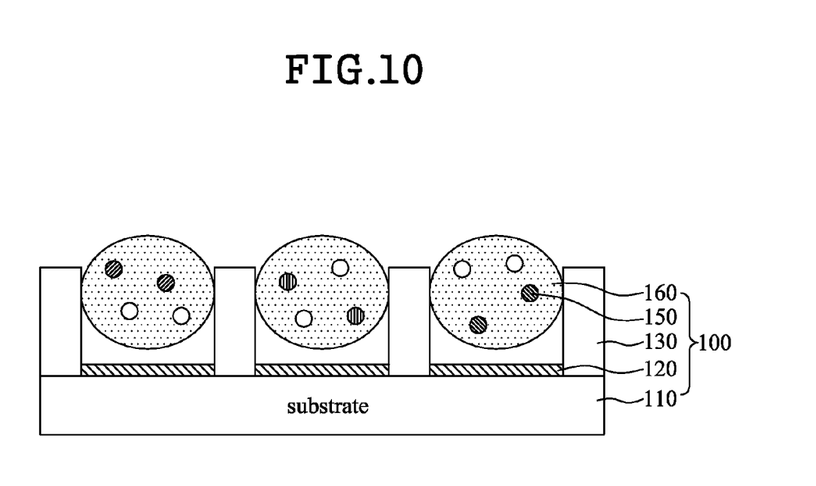
FIG. 10 is a diagram illustrating a portion of a method for manufacturing the electrophoretic display device according to an example embodiment of the present invention.

Hence, as shown in FIG. 10, each of the pixel areas (the filled-cells) may be filled with the electrophoretic dispersion liquid including the charged particles 150 and the dielectric solvent 160.

Here, each of the pixel areas (the filled-cells) may be filled with the electrophoretic dispersion liquid 140 according to a die coating method, a casting method, a bar coating method, a slit coating method, a dispense method, a squeezing method, a screen printing method or an inkjet printing method. The charged particles 150 may be colored with at least one of red, blue, green, yellow, cyan, magenta, black and white. As the dielectric solvent 160, may be used halogenated solvents, saturated hydrocarbons, silicone oils, low molecular weight halogen-containing polymers, epoxides, vinyl ester, aromatic hydrocarbon, toluene, naphthalene, paraffinic liquids, or poly chlorotrifluoroethylene polymers.

If the electrophoretic display device presents full colors, the charged particles 150 may be colored with corresponding colors, which will be displayed by the cells, respectively. In this case, the filling process of the electrophoretic dispersion liquid 140 may be performed dividedly for every color of the colored charged particles 150.

Figure 11A:
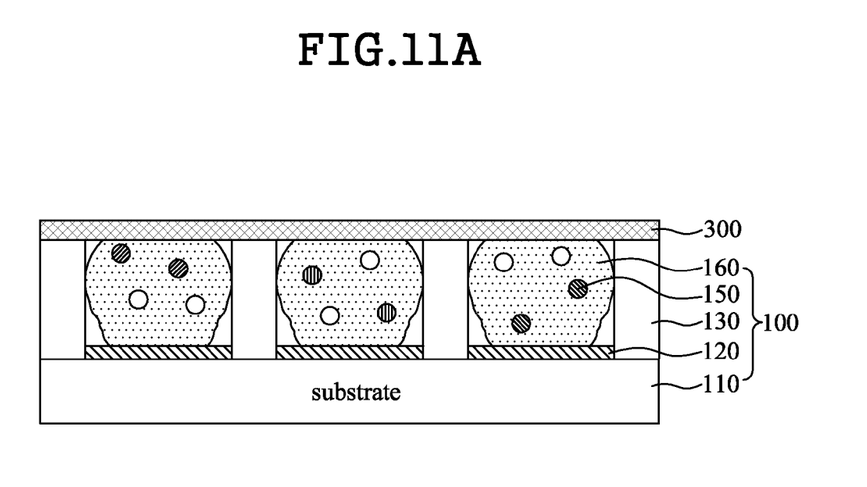
FIG. 11A is a diagram illustrating a portion of a method for manufacturing the electrophoretic display device according to an example embodiment of the present invention.

Hence, as shown in FIG. 11A, on the lower substrate 100 filled with the electrophoretic dispersion liquid, a non polar organic material, such as non polar polymer and non polar epoxy acrylic resin or a non polar organic material, coated to form an organic SAM layer. After that, the non polar organic material is patterned to form the membrane layer 300 including the plurality of the hole patterns 310 (FIGS. 5-6).

The membrane layer 300 is formed over the partition walls 130 and the electrophoretic dispersion liquid 140. Here, the plurality of the hole patterns 310 may be aligned corresponding to an entire portion or a predetermined portion of the pixel areas. The membrane layer 300 may be formed according to the same process performed to manufacture the partition wall 300. Here, the membrane layer 300 is formed with a thickness of 200 nm~1 um.

When the plurality of the hole patterns 310 are formed in a circular shape, as shown in the example of FIGS. 5-6, the circular shape has a diameter of 1 nm~1 µm. Such the plurality of the hole patterns 310 may expose (open) tops of the pixel areas.

The plurality of the hole patterns may be formed in a variety of shapes which can be patterned, rather than the circular shape mentioned above. For example, the plurality of the hole patterns may be rectangular-shaped as shown in FIG. 7. Alternatively, the plurality of the hole patterns may be random as shown in FIG. 8.

When the membrane layer 300 is formed on the electrophoretic dispersion liquid 140, the electrophoretic dispersion liquid 140 formed of the organic material and the membrane layer 300 are adhering to each other, to form a space used to exhaust vapors remaining in the pixel areas outside. Because of that, air remaining in the pixel areas may be exhausted outside via the hole patterns 310. Furthermore, vapors which might be generated during the bonding process between the lower and upper substrates 100 and 200 may be exhausted outside via the hole patterns 310 of the membrane layer 300.

The membrane layer 300 may prevent the vapor generation and the electrophoretic dispersion liquid may be then filled into the pixel areas smoothly and completely. As a result, incomplete filling and overfilling of the electrophoretic dispersion liquid 140 may be prevented.

Together with that, the electrophoretic dispersion liquid 140 supposed to be filled into each of the pixel areas might overflow up to the partition wall or into a neighboring pixel area. The membrane layer 300 may prevent the overflow of the electrophoretic dispersion liquid 140.

Figure 11B:
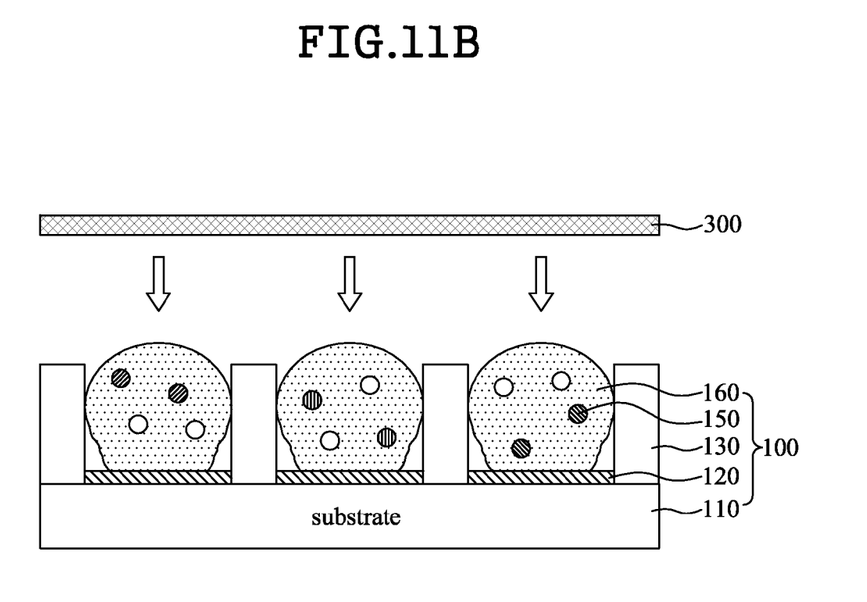
FIG. 11B is a diagram illustrating a portion of a method for manufacturing the electrophoretic display device according to an example embodiment of the present invention.

According to the present invention, the membrane layer 300 may be manufactured separately as shown in FIG. 11B. After the electrophoretic dispersion liquid 140 is filled into the pixel areas, the separately manufactured membrane layer 300 may be attached to a top of the partition wall 130.

The manufacturing process of the lower substrate 100 may be complete via the manufacturing processes shown in FIGS. 9 to 11. Meanwhile, a manufacturing process is performed for the upper substrate 200, separate from the manufacturing process of the lower substrate 100.

Figure 12:
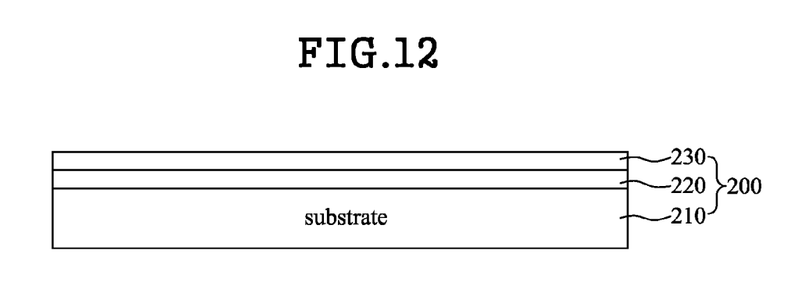
FIG. 12 is a diagram illustrating a portion of a method for manufacturing the electrophoretic display device according to an example embodiment of the present invention.
Figure 13:
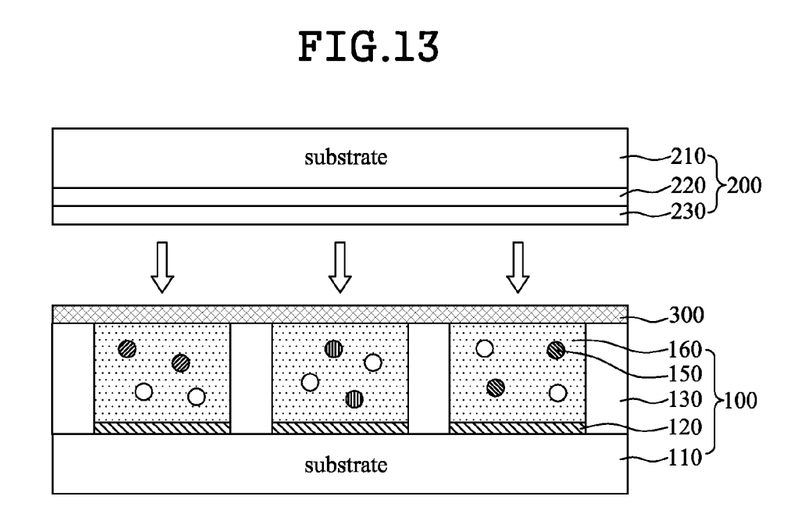
FIG. 13 is a diagram illustrating a portion of a method for manufacturing the electrophoretic display device according to an example embodiment of the present invention.
Figure 14:
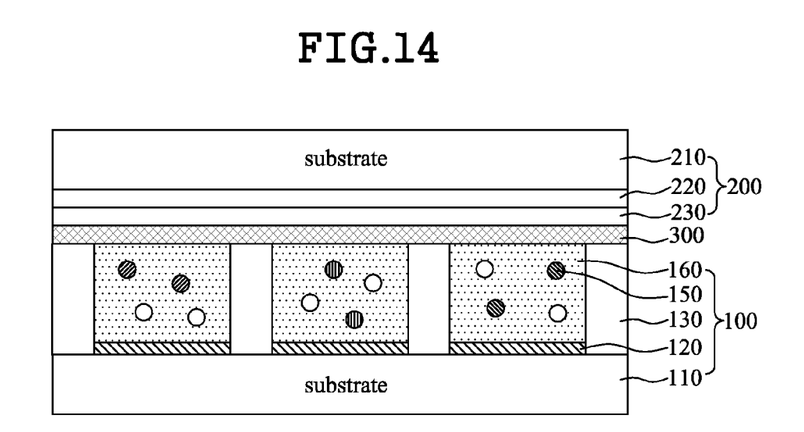
FIG. 14 is a diagram illustrating a portion of a method for manufacturing the electrophoretic display device according to an example embodiment of the present invention.

Specifically, as shown in FIG. 12, a conductive transparent material, such as indium tin oxide (ITO) or indium zinc oxide (IZO), is coated on the upper base substrate 210, to form a common electrode 220. The common electrode 220 supplies a common voltage to each of the pixel areas to drive the charged particles 150 internalized on the lower substrate 100. Here, the upper substrate 200 has to be transparent to display images and the upper base substrate 210 may be formed of transparent glass or transparent plastic with flexibility. After that, an adhesive material or sealant is coated on the common electrode 220, to form the adhesive layer 230. The adhesive layer 230 seals the upper substrate 200 and the lower substrate 100 with each other, to close the electrophoretic dispersion liquid 140 airtight. In addition, the adhesive layer 230 may be employed to separate the charged particles 150 from contacting the common electrode 220.

Here, as shown FIG. 3, the upper substrate 200 and the lower substrate 100 are bonded to each other with the membrane layer 300 located there between. At this time, the bonding between the upper and lower substrates 200 and 100 may be performed in a pressing process applying a predetermined pressure to the substrates 200 and 100. Together with the pressing process, an annealing process applying a predetermined temperature may be performed. When the predetermined pressure is applied in the bonding process between upper and lower substrates 200 and 100, air remaining in the pixel areas is exhausted via the hole patterns 310 of the membrane layer 300 so that the pixel areas may be smoothly filled with the electrophoretic dispersion liquid 140.

Furthermore, the membrane layer 300 is located on the partition walls 130 of the lower substrate 100. As a result, the electrophoretic dispersion liquid 140 filled in a specific pixel area may be prevented from overflowing into a neighboring pixel area.

Using the manufacturing process described above as shown in FIG. 14, the electrophoretic display device including the membrane layer 300 also prevents vapor generation in the filling process of the electrophoretic dispersion liquid 140 may be manufactured. The membrane layer 300 is formed or disposed on the lower substrate 100 according to one embodiment of the present invention. The present invention is not limited thereto.

Figure 15:
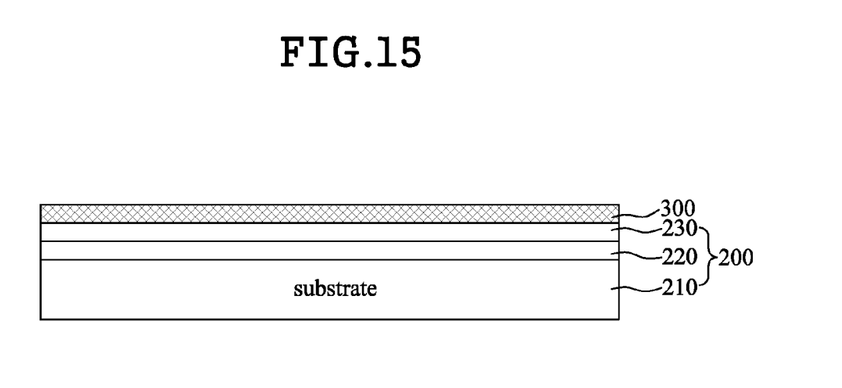
FIG. 15 is a diagram illustrating a portion of a method for manufacturing the electrophoretic display device according to an example embodiment of the present invention.
Figure 16:
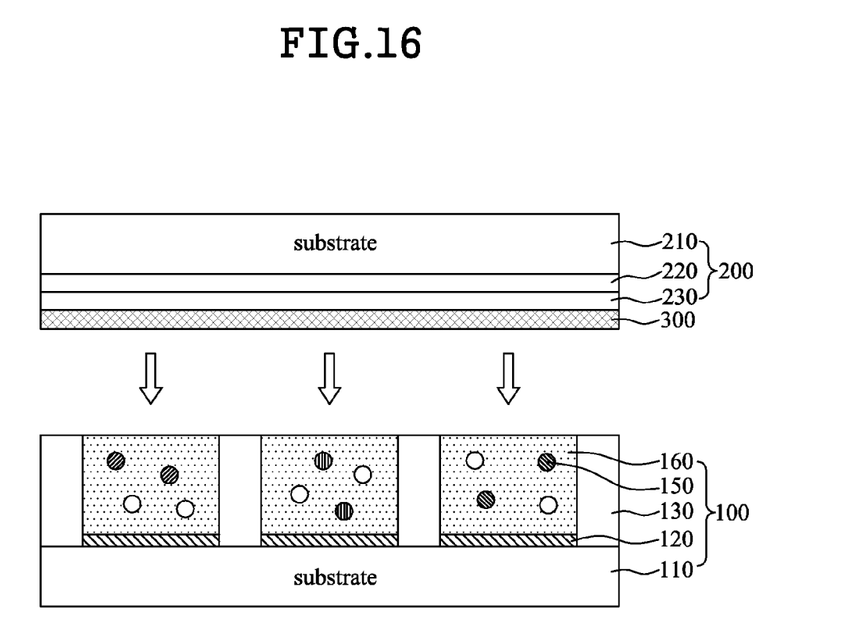
FIG. 16 is a diagram illustrating a portion of a method for manufacturing the electrophoretic display device according to an example embodiment of the present invention.

According to a still further embodiment of the present invention, the membrane layer 300 may be formed on the upper substrate 200 as shown in FIG. 15. In this case, a sealant is provided on a predetermined portion of the upper substrate 200 which is corresponding to the partition walls 130 of the lower substrate 100 as shown in FIG. 16. After that, the lower substrate 100 and the upper substrate 200 may be bonded to each other with the membrane layer 300 disposed there between.

The sealant may be a non-conductive material generating no chemical reaction with the charged particles 150. According to a still further embodiment, sealant is provided in an outer portion of a display area formed on the upper substrate 200 and the bonding between the lower and upper substrates 100 and 200 may be performed after that.

The electrophoretic display device manufactured according to the manufacturing process shown in FIGS. 9 to 16 may heighten driving stability and reliability of the electrophoretic dispersion liquid internalized on the lower substrate. As a result, reflectance and contrast may be enhanced.

Furthermore, the display quality of the electrophoretic display device may be enhanced.

Additionally, incomplete filling and overfilling of the electrophoretic dispersion liquid internalized on the lower substrate may be prevented and vapor generation during the electrophoretic dispersion liquid filling process may be prevented as well.

The method for manufacturing the electrophoretic display device according to the embodiments of the present invention may advantageously use manufacturing infrastructures used to manufacture liquid crystal display devices.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrophoretic display device, comprising: a lower substrate having pixel electrodes thereon to define a plurality of pixel areas; partition walls formed on the lower substrate to surround the pixel electrodes;
   electrophoretic dispersion liquid comprising a plurality of charged particles colored to display colors, the electrophoretic dispersion liquid filled into the plurality of the pixel areas defined by pixel electrodes and surrounding the partition walls;
   a membrane layer disposed on the partition walls and covering the electrophoretic dispersion liquid, the membrane layer comprising a plurality of hole patterns at portions corresponding to the plurality of the pixel areas; and
   an upper substrate bonded with the lower substrate such that the membrane layer is disposed therebetween,
   wherein the membrane having the plurality of the hole patterns exhausts air from inside the plurality of the pixel areas to outside the pixel area.

2. The electrophoretic display device of claim 1, wherein the membrane layer is formed of a non polar organic material comprising a non polar polymer and non polar epoxy acrylic resin or a non polar organic material which is coated to form an organic self-assembled monolayer (organic SAM layer).

3. The electrophoretic display device of claim 1, wherein the membrane layer is formed with a thickness of 200 nm to 1 um.

4. The electrophoretic display device of claim 1, wherein the plurality of the hole patterns are formed in a circular shape or a rectangular shape with a width of 1 nm to 1 μm.

5. The electrophoretic display device of claim 1, wherein the membrane is provided with a yellow tint to improve contrast.

6. The electrophoretic display device of claim 1, further comprising:
   a common electrode formed on the upper substrate corresponding to the plurality of the pixel electrodes to supply a common voltage to drive the charged particles in conjunction with the pixel electrodes; and
   an adhesive layer disposed between the common electrode and the membrane layer, the adhesive layer configured to bond the upper substrate and the lower substrate to each other with the membrane layer disposed there between.

7. The electrophoretic display device of claim 6, wherein the adhesive layer prevents the charged particles from contacting the common electrode.

8. The electrophoretic display device of claim 6, wherein the electrophoretic dispersion liquid is sealed by the partition walls, the membrane layer and the adhesive layer.

9. The electrophoretic display device of claim 1, wherein the partition walls are formed as a single structure to be contiguous.

10. A method for manufacturing an electrophoretic display device, comprising:
    forming a plurality of pixel electrodes on a lower substrate and forming partition walls to surround the plurality of the pixel electrodes;
    filling electrophoretic dispersion liquid comprising a plurality of charged particles colored to display predetermined colors into pixel areas defined by the pixel electrodes and the partition walls;
    disposing a membrane layer on the partition walls, the membrane layer comprising a plurality of hole patterns at portions corresponding to the plurality of the pixel areas; and
    bonding an upper substrate with the lower substrate such that the membrane layer disposed therebetween,
    wherein air remaining in the pixel areas is exhausted outside the pixel area via the membrane having the plurality of the hole patterns.

11. The method for manufacturing the electrophoretic display device of claim 10, wherein the membrane layer is formed of a non polar organic material comprising a non polar polymer and non polar epoxy acrylic resin or a non polar organic material which is coated to form an organic self-assembled monolayer (organic SAM layer), in a photolithography process, an imprinting process or an embossing process.

12. The method for manufacturing the electrophoretic display device of claim 10, wherein the membrane material is the same as a material used to form the partition walls.

13. The method for manufacturing the electrophoretic display device of claim 10, wherein the membrane is provided with a yellow tint to improve contrast.

* * * * *